(12) United States Patent
Dharmapurikar et al.

(10) Patent No.: US 8,978,042 B2
(45) Date of Patent: Mar. 10, 2015

(54) METHOD AND SYSTEM FOR MAINTAINING GAME FUNCTIONALITY FOR A PLURALITY OF GAME INSTANCES RUNNING ON A COMPUTER SYSTEM

(71) Applicant: Google Inc., Mountain View, CA (US)

(72) Inventors: Makarand Dharmapurikar, Fremont, CA (US); Gregory Mitchell Stefanek, Mountain View, CA (US)

(73) Assignee: Google Inc., Mountain View, CA (US)

( * ) Notice: Subject to any disclaimer, the term of this patent is extended or adjusted under 35 U.S.C. 154(b) by 71 days.

(21) Appl. No.: 13/768,031

(22) Filed: Feb. 15, 2013

(65) Prior Publication Data
US 2013/0212601 A1    Aug. 15, 2013

Related U.S. Application Data

(60) Provisional application No. 61/599,347, filed on Feb. 15, 2012.

(51) Int. Cl.
*G06F 13/00* (2006.01)
*G06F 9/50* (2006.01)
*G06F 9/54* (2006.01)

(52) U.S. Cl.
CPC .............. *G06F 9/5005* (2013.01); *G06F 9/545* (2013.01); *G06F 2209/542* (2013.01)
USPC .......................................... 719/313; 719/320

(58) Field of Classification Search
CPC ............................ G06F 9/45512; G06F 9/546
USPC ................................................... 719/313, 320
See application file for complete search history.

(56) References Cited

U.S. PATENT DOCUMENTS

| | | | |
|---|---|---|---|
| 6,222,529 B1* | 4/2001 | Ouatu-Lascar et al. | 715/745 |
| 8,087,018 B2* | 12/2011 | Yoav et al. | 718/100 |
| 8,090,797 B2* | 1/2012 | Chinta et al. | 709/217 |
| 8,167,722 B2* | 5/2012 | Beverly | 463/42 |
| 2005/0197815 A1* | 9/2005 | Grebenev | 703/14 |
| 2008/0052755 A1* | 2/2008 | Pham et al. | 726/1 |
| 2010/0031260 A1* | 2/2010 | Morocz | 718/100 |
| 2010/0131656 A1* | 5/2010 | Tsym | 709/227 |
| 2010/0211934 A1* | 8/2010 | Simons et al. | 717/126 |
| 2010/0262977 A1* | 10/2010 | Havemose | 719/310 |
| 2011/0142043 A1* | 6/2011 | Oved | 370/390 |
| 2012/0079508 A1* | 3/2012 | Needamangala et al. | 719/327 |
| 2014/0189654 A1* | 7/2014 | Keromytis et al. | 717/126 |

* cited by examiner

*Primary Examiner* — Andy Ho (57) ABSTRACT

A container layer for allowing a plurality of game instances running on an operating system to maintain full game functionality is configured to intercept a communication from a game instance of the plurality of game instances to the operating system and provide an appropriate response to the intercepted communication.

22 Claims, 4 Drawing Sheets

METHOD AND SYSTEM FOR MAINTAINING GAME FUNCTIONALITY FOR A PLURALITY OF GAME INSTANCES RUNNING ON A COMPUTER SYSTEM

CROSS-REFERENCE TO RELATED APPLICATIONS

This present application claims the benefit of U.S. Provisional Application No. 61/599,347, filed Feb. 15, 2012, which is hereby incorporated by reference in its entirety.

FIELD OF THE INVENTION

This invention relates to the field of running a plurality of game instances on a computer system and in particular to maintaining full game functionality for the plurality of game instances.

BACKGROUND

Running multiple game instances on a single computer system (e.g., server) is often very advantageous in that it allows for efficient utilization of system resources (e.g., processor, memory, storage, input/output (I/O) devices, audio/video, network resources, etc.). However, running multiple game instances on a single computer system poses significant problems when attempting to maintain simultaneous game functionality for each of the game instances.

Using the Windows operating system as an example, when multiple game instances are running simultaneously on a single operating system, only a single game instance is given complete access to the necessary system resources at one time. For example, the game instance running in the foreground is given access to I/O devices (e.g., keyboard, mouse, audio, etc.), while game instances running in the background are not allowed access to the input/output devices. This is to ensure that contention for certain system resources does not occur. However, by only allowing a single game instance to have access to all necessary system resources, other game instances running on the computer system are unable to maintain full game functionality. For example, game instances running in the background are not granted access to certain I/O devices (e.g., keyboard and mouse) and thus cannot perform certain actions (e.g., using I/O devices, using system audio/video, etc.) to maintain full game functionality. Because game programs are written to have access to all of the necessary resources of a computer system in order to maintain full game functionality, a game instance running in the background cannot maintain full game functionality because it is unable to access all the necessary resources of the computer system as some of those resources are being used exclusively by the game instance running the foreground.

Prior approaches for allowing multiple games instances to share resources while maintaining full game functionality have involved virtualizing the computer system such that a plurality of virtual machines may each run a single game instance as if it is the only game instance on the machine. However, installing full virtual machines on a computer system is often very expensive and resource intensive. For example, a separate operating system instance is needed for each virtual machine, leading to consumption of additional computer system resources which could instead be used for running additional game instances.

Therefore there is a desire for an improved approach for allowing multiple game instances running on a computer system to maintain full game functionality without requiring the execution of multiple operating systems.

BRIEF DESCRIPTION OF THE DRAWINGS

In order that the present invention is better understood an approach for allowing multiple game instances running on a computer system to maintain full game functionality will now be described, by way of example only, with reference to the accompanying drawings in which like reference numerals are used to denote like parts, and in which.

DETAILED DESCRIPTION

Various embodiments are described hereinafter with reference to the figures. It should be noted that the figures are not necessarily drawn to scale. It should also be noted that the figures are only intended to facilitate the description of the embodiments and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

According to some embodiments, a container layer or container layer modules are provided in which the container layer/container layer module is configured to form an interface between one or more game instances running on a computer system and an operating system of the computer system. The container layer or container layer modules are configured to intercept, modify, and respond to communications made between the game instances and the operating system of the computer system such that each game instance running on the computer system is able to maintain full game functionality. In this way, embodiments of the invention allow for multiple game instances running on a computer system to maintain full game functionality.

Figure 1:
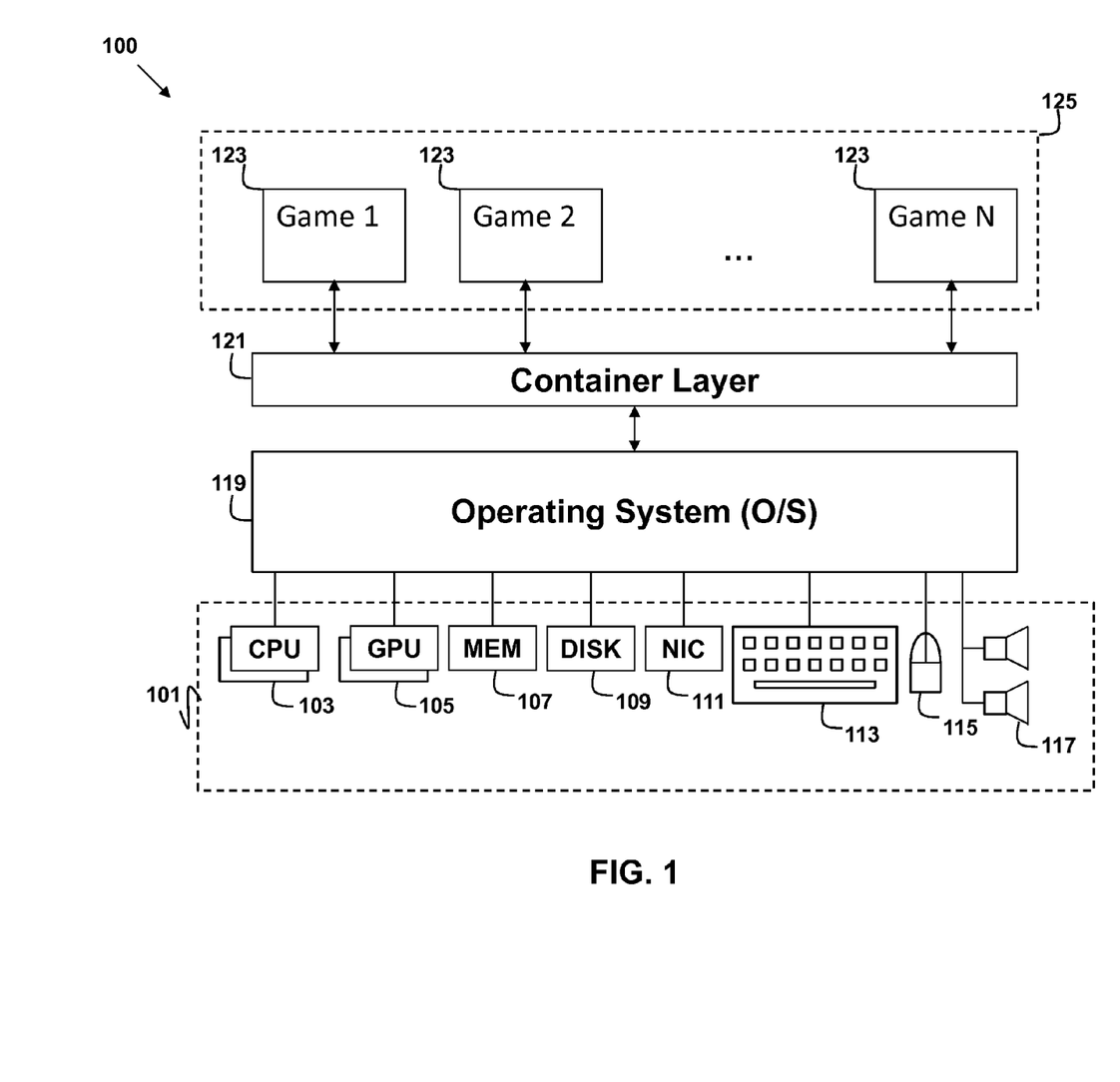
FIG. 1 illustrates a block diagram of a computer system that includes a container layer configured to allow multiple game instances to maintain full game functionality while running on the computer system in accordance with some embodiments.

FIG. 1 illustrates a computer system that includes a container layer configured to allow multiple game instances to maintain full game functionality while running on the computer system in accordance with some embodiments. The computer system 100 includes various hardware resources 101 including, for example, one or more central processing units (CPU) 103, one or more graphics processing units (GPUs) 105, a memory 107, a disk 109, a network interface card (NIC) 111, a keyboard 113, a mouse 115, and one or more audio devices 117. In other embodiments, the network interface may be implemented directly on the mother board. Also, in other embodiments, the hardware resources 101 may not include a physical keyboard or mouse attached to it, and inputs may come over a network through the container layer. An operating system 119 associated with the computer system 100 runs above the hardware resources 101 and manages access to the various hardware resources 101 of the computer system 100.

A plurality of game instances 125 are run on the computer system 100. As used herein, the term game instance refers to an instantiation of a game program. In some embodiments, each game instance 123 of the plurality 125 may correspond to a different game program while in other embodiments, each game instance 123 of the plurality 125 may correspond to the same game program. The plurality of game instances 125 may also be any combination of instantiations of any number of game programs. A game instance 123 running on the computer system 100 shares the hardware resources 101 of the computer system 100 with every other game instance 123 running on the computer system 100.

Game programs and particularly game instances 123 are designed to have access to all of the necessary resources 101 of a computer system 100 in order to maintain full game functionality. Said otherwise, each game instance 123 is written such that it believes that it is the only game running on the operating system 119 and thus can only maintain full game functionality when it is able to access and use all the necessary resources 101 of the computer system 100. As used herein, the term maintaining full game functionality refers to a game's ability to execute all features and instructions throughout the entire duration of the game instance.

However, normal operating systems 119 are configured to allow only a single game instance 123 to access all of the necessary operating system 119 and necessary hardware resources 101 of the computer system 100 at a given time. A game instance 123 running in the foreground of the operating system 119 is given access to all of the necessary operating system 119 and necessary hardware resources 101 of the computer system 100, while a game instance 123 running in the background of the operating system 119 is only given access to certain features of the operating system 119 and certain hardware resources 101 of the computer system 100, wherein these certain features and resources may not include all of the necessary features and resources. As used herein, the term running in the foreground refers to a game instance 123 that is running on the operating system 119 in a state such that it has access to all of the necessary operating system 119 and necessary hardware resources 101 of the computer system 100. Likewise, as used herein, the term running in the background refers to a game instance 123 that is running on the operating system in a state such that it does not have access to all of the necessary operating system 119 and necessary hardware resources 101 of the computer system 100. Only game instances 123 that believe they are running in the foreground throughout the duration of the game instance 123 are able to maintain full game functionality. As used herein, the concept of game instances believing they are running in the foreground refers to game instances that make communications to an operating system and receive responses to communications as if they are running in the foreground of the operating system.

Using the Windows operating system as an example, a game instance 123 running in the foreground is given access to input/output (I/O) devices (e.g., keyboard, mouse, etc.), while game instances 123 running in the background are not allowed access to the input/output devices.

Operating systems are designed to allow only one game instance 123 to run in the foreground at a time and have full access to necessary system resources 101 to help ensure that contention for certain system resources 101 does not occur. Thus, a normal operating system 119 does not allow a game instance 123 running in the background to maintain full game functionality because it is unable to access all the necessary resources 101 of the computer system 100 as some of those resources 101 are being used exclusively by the game instance 123 running the foreground.

In order for each game instance 123 of the plurality of game instances 125 to maintain full game functionality when running on a single operating system 119, an intermediate software layer is introduced which forms an interface between the plurality of game instances 125 and the operating system 119 associated with the computer system 100. This intermediate software layer is referred to herein as a container layer 121. The container layer 121 is configured to intercept, filter, modify, and respond to communications made between the game instances 123 and the operating system 119 of the computer system 100 such that each game instance 123 running on the computer system 100 is able to maintain full game functionality, which will be discussed in more detail below.

The container layer 121 is unknown to each game instance 123, and provides each game instance 123 with the impression that it is the only game running on the operating system 119. Likewise, the container layer 121 is unknown to the operating system 119, and provides the operating system 119 with the impression that only one game instance is running in the foreground at any moment during operation. As used herein, the concept of the operating system having an impression that only one game instance is running in the foreground refers to the operating system receiving communications and providing responses as if only a single game instance is running in the foreground. The container layer 121 accomplishes this by intercepting communications made by any game instance 123 of the plurality of game instances 125 running on the computer system 100 and filtering them out or modifying them to appear as if they are coming from a game instance 123 running in the foreground of the operating system 119 and also by modifying them such that they do not conflict with communications made by any other game instance 123 running on the operating system 119. The container layer 121 additionally transforms responses from the operating system 119 that correspond to modified communications such that transformed responses correspond to original game instance communications rather than modified communications. The container layer 121 may also create responses to correspond to original game instance communications that were filtered out and not sent to the operating system. The functionality of the container layer will be discussed in further detail below.

Thus, each game instance 123 may maintain full game functionality as each game instance 123 runs as if it is the only game executing on the operating system 119. Similarly, the operating system 119 can support multiple game instances 123, with each game instance 123 being able to maintain full game functionality, as the operating system 119 believes that only one game instance 123 of the plurality of game instances 125 is running in the foreground at any moment. The container layer 121 can be implemented without modifying any game instance 123 or operating system 119, as any game instance 123 and operating system 119 continues to operate normally because they are unaware of the existence of the container layer 121.

The container layer 121 may remain aware of attributes and information associated with each game instance 123 running on the operating system 119 through metadata (not shown) stored within a storage component (e.g., memory, disk, etc.) associated with the container layer 121.

The container layer 121 in FIG. 1 is implemented as a single container layer 121 that provides an interface between the plurality of game instances 125 and the operating system 119 of the computer system 100. However, in other embodiments, the container layer may be implemented as a plurality of container layer modules, with each container layer module providing an interface between a corresponding game instance and the operating system of the computer system.

Figure 2:
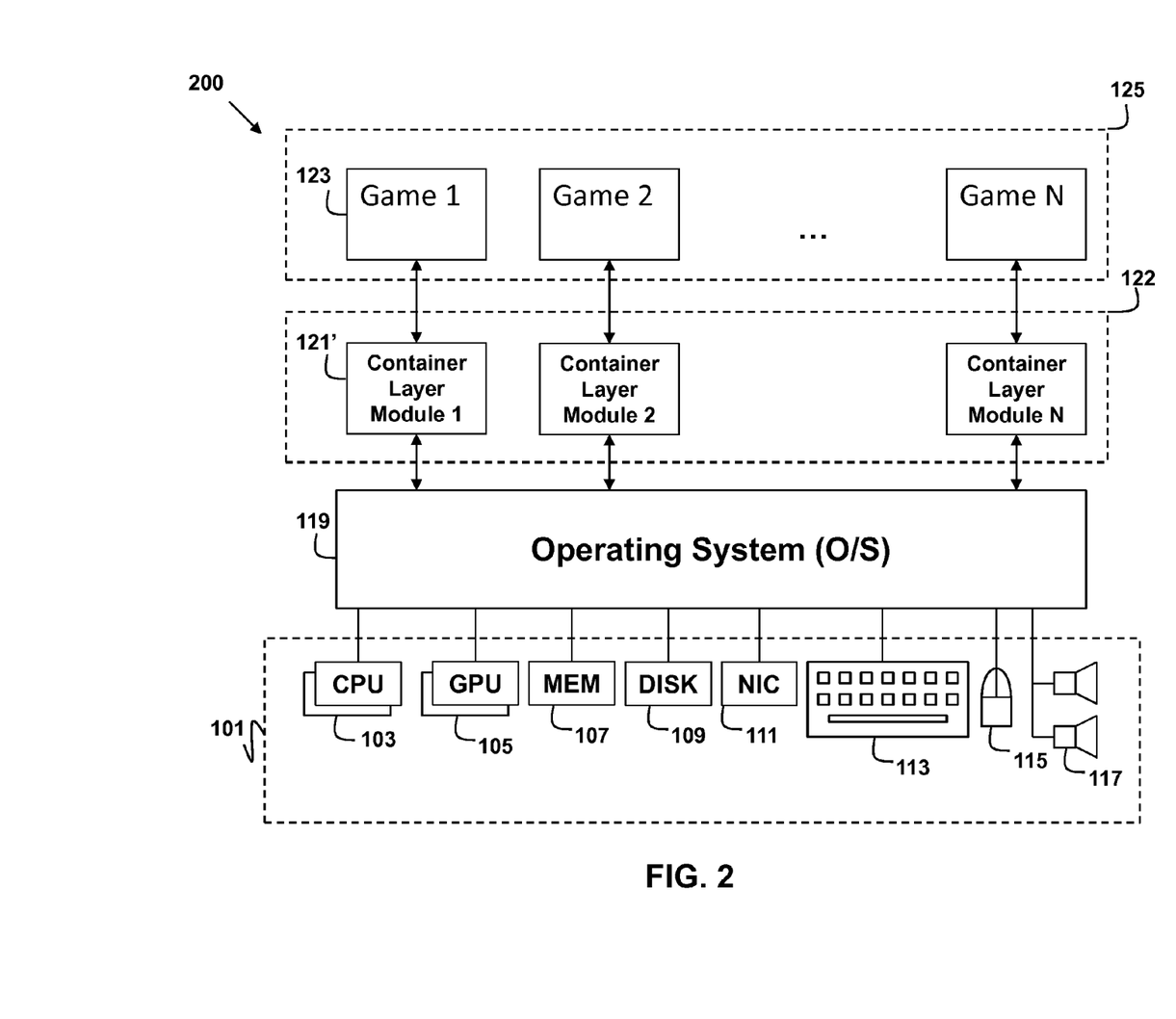
FIG. 2 illustrates a block diagram of a computer system that includes a plurality of container layer modules configured to allow multiple game instances to maintain full game functionality while running on the computer system in accordance with some embodiments.

FIG. 2 illustrates a block diagram of a computer system 200 that includes a plurality of container layer modules 122 configured to allow a plurality of game instances 125 to maintain full game functionality while running on the computer system 200 in accordance with some embodiments. The computer system 200 of FIG. 2 is substantially similar to the computer system 100 described above in FIG. 1. For purposes of discussion, only new features of the computer system 200 will be discussed.

While the computer system 100 described above in FIG. 1 includes a single container layer 121 that serves as an interface between the plurality of game instances 125 and the operating system 119, the computer system 200 of FIG. 2 includes a plurality of container layer modules 122, each container layer module 121' providing an interface between a corresponding game instance 123 and the operating system 119. Each container layer module 121' is unknown to its corresponding game instance 123, and provides its corresponding game instance 123 with the impression that it is the only game running on the operating system 119. Likewise, each container layer module 121' is unknown to the operating system 119, and provides the operating system 119 with the impression that only one game instance 123 is running in the foreground at any moment during operation. The container layer modules 121' accomplish this by intercepting communications made by their corresponding game instances 123 and filtering them out or modifying them to appear as if they are coming from a game instance 123 running in the foreground of the operating system 119 and also by modifying them such that they do not conflict with communications made by any other game instance 123 running on the operating system 119. The container layer modules 121' additionally transform responses from the operating system 119 that correspond to modified communications such that transformed responses correspond to original game instance communications rather than modified communications. The container layer modules 121' may also create responses to correspond to original game instance communications that were filtered out and not sent to the operating system. The functionality of the container layer module will also be discussed in further detail below.

In some embodiments, each container layer module 121' may become aware of attributes and information associated with other container layer modules 121' and their corresponding game instances 123 through shared metadata (not shown). In other embodiments, each container layer module 121' may become aware of attributes and information associated with other container layer modules 121' and their corresponding game instances 123 through a shared communication link such as a network (not shown).

Figure 3:
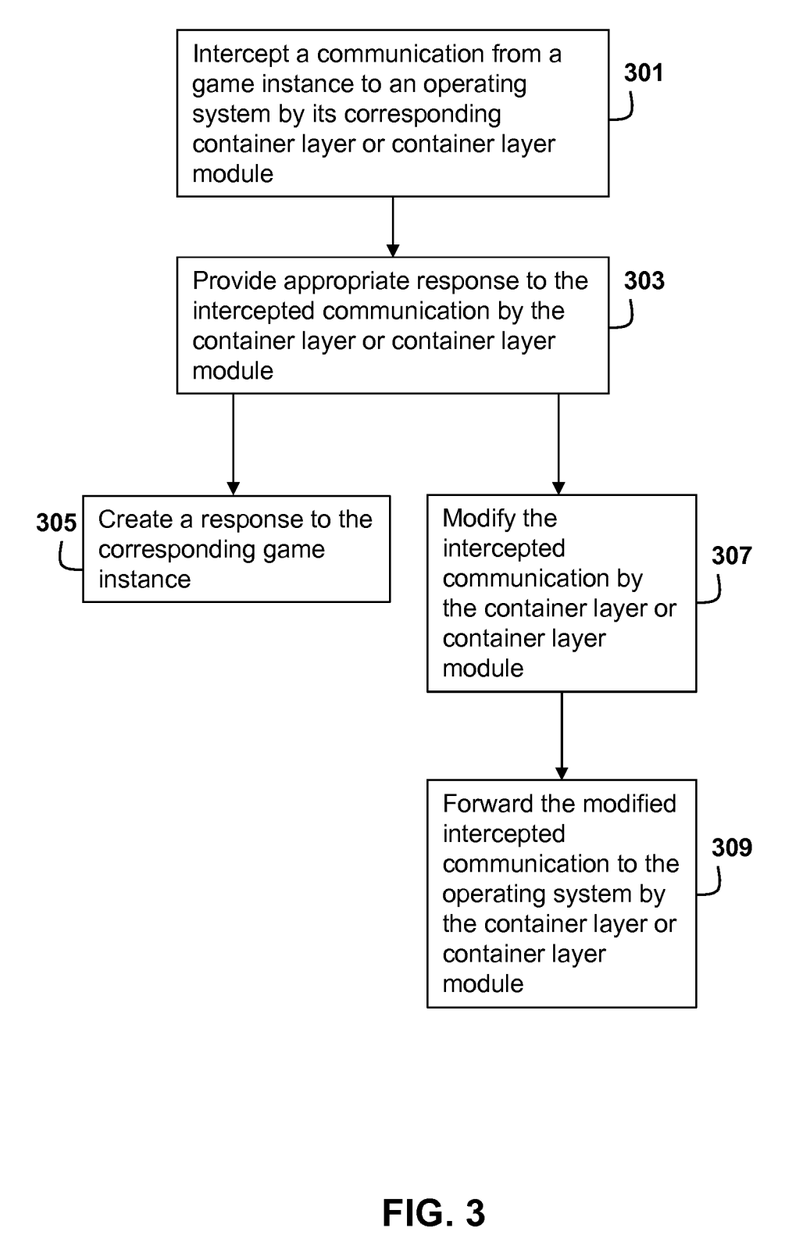
FIG. 3 is a flow diagram illustrating a method for handling game instance communications for a plurality of game instances running on a computer system while maintaining full game functionality for the plurality of game instances in accordance with some embodiments.

FIG. 3 is a flow diagram illustrating a method for handling game instance communications for a plurality of game instances running on a computer system while maintaining full game functionality for the plurality of game instances in accordance with some embodiments. The method described in FIG. 3 may be used in conjunction with the single container layer 121 described in FIG. 1 and may also be used in conjunction with the plurality of container layer modules 122 described in FIG. 2.

Initially, a communication made from a game instance to an operating system is intercepted by its corresponding container layer or container layer module as described at 301. The container layer or container layer module is configured to intercept certain communications made from a game instance to the operating system that may potentially conflict with communications made from other game instances to the operating system. For example, communications that involve 3D rendering access (e.g., Microsoft D3D), 2D rendering access (e.g., Microsoft DirectDraw), cursor access, operating system configuration settings access (e.g., Microsoft Windows Registry), audio access, mouse access, keyboard access, and other input device access, file system access, process information access, or network access may be intercepted by the container layer or container layer module.

Next, an appropriate response is provided to the intercepted communication by the container layer or container layer module as described at 303.

When the appropriate response may be provided without communicating with the operating system, the container layer or container layer module may filter out the communication and create a response to the corresponding game instance as described at 305. Such a created response may be a modification of the normal response that would be provided by the operating system had the corresponding game instance communicated directly with the operating system. For example, a game instance that is running in the background may make a communication to the operating system asking for its foreground/background status. In order to maintain full game functionality, the container layer or container layer module corresponding to the game instance must create a response that indicates the game instance is running in the foreground. This response would be different had the game instance communicated directly with the operating system, as the operating system would have responded with an indication that the game instance is running in the background. The created response may be provided without communicating with the operating system (e.g., bypassing the operating system) when the container layer/container layer module has sufficient information (e.g., metadata) to provide an appropriate response.

It is important to note that the created response provided to the corresponding game instance must be configured such that the corresponding game instance believes that it is running in the foreground and able to access all necessary resources of the computer system, regardless of the type of communication made by the game instance.

When the appropriate response provided to the intercepted communication requires communicating with the operating system, the intercepted communication may first be modified by the container layer or container layer module as described at 307.

The intercepted communication must be modified such that the modified intercepted communication will appear to the operating system as if it was made by a game instance operating in the foreground. This is because the operating system will only allow the game instance access to all necessary resources of the computer system when the game instance is running in the foreground. Thus, communications made by game instances that are running in the background are modified to appear as if they are being made by a game instance running in the foreground. Communications made by game instances that are running in the foreground need not be modified to appear as if they are being made by a game instance running in the foreground.

Additionally, the intercepted communication must be modified such that it does not conflict with communications being made by other game instances running on the operating system. This is because in order to maintain full game functionality for all game instances running in the computer system, communications made by a game instance must not conflict (e.g., attempt to access same resource at same time) with communications made by any other game instance running on the computer system. For computer systems with a single container layer, the single container layer maintains attributes and information associated with all game instances running in the computer system in order to coordinate conflict checks. For computer systems with a plurality of container layer modules, the container layer modules may become aware of attributes and information associated with other container layer modules and their corresponding game instances through shared metadata or a shared communication link in order to coordinate conflict checks as discussed above.

For example, where a game instance requests that the operating system use a particular socket number for networked communication, and other game instances running in the computer system are also programmed to use the same socket number, the container layer or container layer module corresponding to the requesting game instance may modify the request such that a different socket number from the socket number being requested is presented to the operating system. In this way, the requesting game instance believes that it is requesting a particular socket number from the operating system when it is in fact being assigned to a different socket number. This is to prevent the requesting game instance from potentially requesting the same socket number as another game instance running on the operating system, while at the same time making the requesting game instance believe that it has full access to all necessary hardware resources of the computer system. When the requesting game instance is running in the background, its corresponding container layer or container layer module must also modify the communication to appear to the operating system as if it originated from a game instance running in the foreground.

The modified intercepted communication is then forwarded to the operating system by the container layer or container layer module as described at 309. Because the intercepted communication has been modified by the container layer or container layer module, the modified intercepted communication is shielded from conflicting with communications from any other game instance running in the computer system and appears to the operating system as if it is coming from a game instance running in the foreground.

Each modified intercepted communication is responded to by the operating system as if it was received from a game instance running in the foreground. Thus, the operating system may be unaware of which particular game instance its response to the modified intercepted communication should be directed to. As such, responses from the operating system to a modified intercepted communication are optionally filtered or modified when handled by the container layer or each container layer module prior to reaching a game instance.

Figure 4:
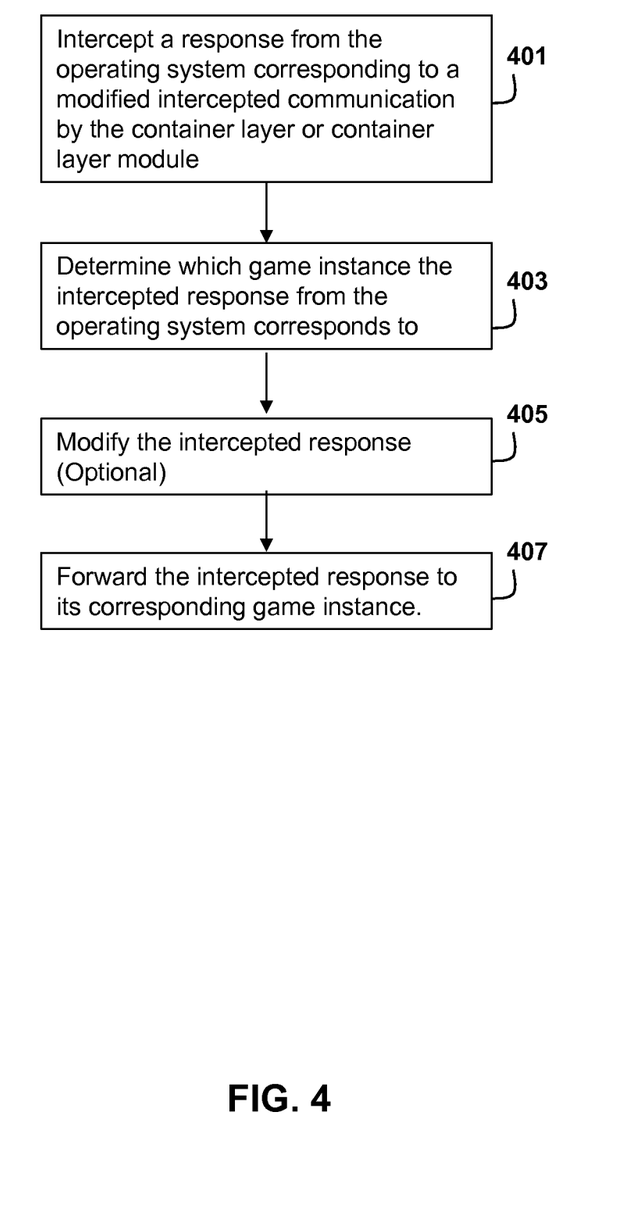
FIG. 4 is a flow diagram illustrating a method for handling operating system responses to modified game instance communications for a plurality of game instances running on a computer system while maintaining full game functionality for the plurality of game instances in accordance with some embodiments.

FIG. 4 is a flow diagram illustrating a method for handling operating system responses to modified game instance communications for a plurality of game instances running on a computer system while maintaining full game functionality for the plurality of game instances in accordance with some embodiments.

The container layer or each container layer module intercepts a response from the operating system corresponding to a modified intercepted communication as described at 401. In embodiments where the computer system includes a single container layer, a single response from the operating system corresponding to a modified intercepted communication is intercepted by the container layer. In other embodiments where the computer system includes a plurality of container layer modules, a single response from the operating system corresponding to a modified intercepted communication is broadcast and intercepted by each container layer module.

The container layer or container layer module then determines which game instance the response from the operating system corresponds to as described at 403. Where there is only a single container layer, the single container layer makes the determination as to which game instance the response from the operating system corresponds to. However, where there is a plurality of container layer modules, each container layer module makes a determination as to whether the response from the operating system corresponds to its associated game instance. If a container layer module determines that the response from the operating system does not correspond to its associated game instance, the response is simply ignored. The container layer or container layer module may determine which game instance the response from the operating system corresponds to by examining metadata associated with its corresponding game instance(s). In some embodiments, the container layer or all of the container layer modules may determine that the response from the operating system corresponding to a modified intercepted communication is not needed by any of the game instances, at which point the container layer or container layer modules simply filter out the response.

When the response from the operating system corresponding to a modified intercepted communication is needed by a game instance, the container layer or container layer module associated with the game instance for which the response from the operating system corresponds to may then optionally modify the response as described at 405. In modifying the response, the container layer or container layer module must modify the response to appear as if it corresponds to the original game instance communication and not the modified intercepted communication. This will now be illustrated using the example from above where the requesting game instance requests that the operating system use a particular socket number for networked communication and the request is modified by the container layer/container layer module so that a different socket number from the socket number being requested is presented to the operating system. The operating system may respond by indicating that the different socket number is being used. The container layer/container layer module associated with the game instance to which the response from the operating system corresponds may then modify the response indicating that the different socket number is being used to instead indicate that the particular socket number requested by the game instance is being used. This way the game instance believes that it has access to all resources of the computer system when in actuality its corresponding container layer/container layer module is handling communications to and from the operating system to allow the game instance to believe that it is the only game running in the foreground of the operating system, thus allowing it to maintain full game functionality.

It is important to note that not all responses from the operating system need to be modified. In some situations, the container layer or container layer module need only make a determination as to which game instance a response from the operating system corresponds. For example, where the response from the operating system merely indicates that a particular button on a keyboard was activated, no modification to the response is necessary.

The response (modified or unmodified) is then forwarded only to the corresponding game instance by the container layer or container layer module as described at 407. Because the response appears to the corresponding game instance as if it corresponds to the original game instance communication, the corresponding game instance continues to believe that it is running in the foreground and thus is able to maintain full game functionality.

In the foregoing specification, the invention has been described with reference to specific embodiments thereof. It will, however be evident that various modifications and changes may be made thereto without departing from the broader spirit and scope of the invention. The specification and drawings are, accordingly, to be regarded in an illustrative rather than restrictive sense.

What is claimed is:

1. A container layer for allowing a plurality of game instances running on an operating system of a computing device to maintain full game functionality, the container layer configured to:
   intercept a first communication from a first game instance of the plurality of game instances to the operating system, and intercept a second communication from a second game instance of the plurality of game instances to the operating system;
   modify the first intercepted communication such that the first modified intercepted communication appears as if the first game instance is running in the foreground, and forward the first modified intercepted communication to the operating system; and
   create a response to the second intercepted communication and transmit the response to the second intercepted communication back to the second game instance.

2. The container layer of claim 1, wherein at least one of the intercepted first communication or the intercepted second communication involves 3D rendering access, 2D rendering access, cursor access, operating system configuration settings access, audio access, input device access, file system access, process information access, or network access.

3. The container layer of claim 1, wherein, when intercepting the first communication and the second communication, the container layer is configured to filter all communications from the plurality of game instances to the operating system and to selectively intercept communications based on an operating status of a game instance corresponding to each communication.

4. The container layer of claim 3, wherein the response created to the second intercepted communication is a modification of a normal response that would be provided by the operating system had the second game instance communicated directly with the operating system.

5. The container layer of claim 3, wherein the container layer is configured to send the response created to the second intercepted communication directly back to the second game instance, bypassing the operating system.

6. The container layer of claim 1, wherein the container layer is further configured to:
   intercept a response from the operating system corresponding to the first modified intercepted communication;
   determine that the intercepted response from the operating system corresponds to the first game instance; and
   forward the intercepted response to the first game instance.

7. The container layer of claim 6, wherein, when intercepting the response from the operating system to the first modified intercepted communication, the container layer is configured to filter all responses from the operating system and to selectively intercept responses corresponding to modified communications.

8. The container layer of claim 6, wherein the container layer is further configured to modify the intercepted response prior to forwarding the intercepted response to the first game instance.

9. The container layer of claim 8, wherein the intercepted response is modified to appear as if it corresponds to the first communication intercepted from the first game instance, and not the modified intercepted communication.

10. The container layer of claim 1, wherein the response created to the second intercepted communication will appear to the second game instance as if the second game instance is operating in the foreground.

11. The container layer of claim 1, wherein the container layer is configured to modify the first intercepted communication so as to remove one or more conflicts between the first intercepted communication and communications made by remaining game instances of the plurality of game instances so that the first modified intercepted communication appears to the operating system as if the first game instance is running in the foreground.

12. A method for maintaining full game functionality for a plurality of game instances running on an operating system of a computing device, comprising:
   intercepting, at a container layer, a first communication from a first game instance of the plurality of game instances to the operating system and intercepting a second communication from a second game instance of the plurality of game instances to the operating system;
   modifying, at the container layer, the first intercepted communication so that the first game instance appears to the operating system to be running in the foreground, and forwarding the first modified intercepted communication to the operating system; and
   generating, at the container layer, a response to the second intercepted communication.

13. The method of claim 12, wherein at least one of intercepting a first communication or intercepting the second communication comprises intercepting a communication involving one of 3D rendering access, 2D rendering access, cursor access, operating system configuration settings access, audio access, input device access, file system access, process information access, or network access.

14. The method of claim 12, wherein intercepting a first communication and intercepting a second communication comprises filtering out the first intercepted communication and the second intercepted communication from a plurality of communications from the plurality of game instances to the operating system.

15. The method of claim 14, wherein generating a response to the second intercepted communication comprises modifying a normal response that would be provided by the operating system had the second game instance communicated directly with the operating system.

16. The method of claim 14, wherein generating a response to the second intercepted communication comprises bypassing the operating system and forwarding the generated response directly back to the second game instance.

17. The method of claim 12, wherein modifying the first intercepted communication comprises modifying the first intercepted communication such that it does not conflict with communications being made by other game instances running on the operating system.

18. The method of claim 12, further comprising:
intercepting, at the container layer, a response from the operating system corresponding to the first modified intercepted communication;
determining, at the container layer, that the intercepted response from the operating system corresponds to the first game instance; and
forwarding the intercepted response to the first game instance.

19. The method of claim 18, wherein determining that the intercepted response from the operating system corresponds to the first game instance comprises filtering out the intercepted response from a plurality of responses received from the operating system.

20. The method of claim 18, further comprising modifying the intercepted response prior to forwarding the intercepted response to the first game instance.

21. The method of claim 20, further comprising modifying, at the container layer, the intercepted response to appear as if it corresponds to the first intercepted communication and not to the first modified intercepted communication.

22. A container layer that forms an interface between a plurality of game instances running on an operating system of a computing device and the operating system, the container layer configured to:
provide access to hardware resources for at least a first game instance and a second game instance of the plurality of games instances by filtering, modifying, or forwarding communications to the operating system made by the first game instance and the second game instance; and
allow the operating system to maintain full game functionality for the first game instance and the second game instance by filtering, modifying, creating or forwarding responses corresponding to the communications made by the first game instance and the second game instance such that the first game instance and the second game instance appear to be running in the foreground,
wherein the first game instance, the second game instance, and the operating system are not modified to support the container layer.

* * * * *